United States Patent
DiFulgentiz

(10) Patent No.: US 9,217,579 B2
(45) Date of Patent: Dec. 22, 2015

(54) SYSTEM AND METHOD FOR AUTOMATICALLY PROGRAMMING HVAC SYSTEM TEMPERATURE ADJUSTMENT TIMES

(75) Inventor: Robert A. DiFulgentiz, Frisco, TX (US)

(73) Assignee: Lennox Industries, Inc., Richardson, TX (US)

( * ) Notice: Subject to any disclaimer, the term of this patent is extended or adjusted under 35 U.S.C. 154(b) by 711 days.

(21) Appl. No.: 13/302,999

(22) Filed: Nov. 22, 2011

(65) Prior Publication Data

US 2012/0290138 A1    Nov. 15, 2012

Related U.S. Application Data

(60) Provisional application No. 61/484,918, filed on May 11, 2011.

(51) Int. Cl.
*G05D 23/19* (2006.01)
*F24F 11/00* (2006.01)

(52) U.S. Cl.
CPC .............. *F24F 11/006* (2013.01); *G05D 23/19* (2013.01); *F24F 2011/0065* (2013.01); *F24F 2011/0068* (2013.01); *F24F 2011/0069* (2013.01); *F24F 2011/0071* (2013.01); *F24F 2011/0073* (2013.01)

(58) Field of Classification Search
CPC ...................... F24F 11/0009; F24F 2011/0071; F24F 2011/0069; F24F 2011/0073; F24F 2011/0065; F24F 2011/0068; G05D 23/19
USPC ...................... 700/278, 295; 705/14, 58; 5/423
See application file for complete search history.

(56) References Cited

U.S. PATENT DOCUMENTS

| | | | | |
|---|---|---|---|---|
| 8,154,398 B2* | 4/2012 | Rolf et al. | ...................... | 340/506 |
| 8,181,290 B2* | 5/2012 | Brykalski et al. | ................. | 5/423 |
| 8,406,162 B2* | 3/2013 | Haupt et al. | .................. | 370/311 |
| 2006/0142968 A1 | 6/2006 | Han et al. | | |
| 2006/0283965 A1 | 12/2006 | Mueller et al. | | |
| 2007/0067300 A1* | 3/2007 | Ollis et al. | ....................... | 707/10 |
| 2009/0158758 A1 | 6/2009 | Eguchi | | |
| 2009/0243852 A1* | 10/2009 | Haupt et al. | .................. | 340/541 |
| 2009/0282357 A1* | 11/2009 | Schultz et al. | ................ | 715/771 |
| 2009/0316671 A1* | 12/2009 | Rolf et al. | ..................... | 370/338 |

(Continued)

FOREIGN PATENT DOCUMENTS

JP    2007-285562 A    11/2007
JP    2009-236351 A    10/2009

OTHER PUBLICATIONS

European Search report dated Mar. 4, 2014, Applicant: Lennox Industries Inc., 6 pages.

*Primary Examiner* — Charles Kasenge
(74) *Attorney, Agent, or Firm* — Baker Botts, LLP

(57) ABSTRACT

A programmable HVAC controller, a method of automatically programming HVAC system temperature adjustment times and an HVAC system incorporating the system or the method. In one embodiment, the programmable HVAC controller includes: (1) a memory subsystem, (2) a communication subsystem configured to receive a wake-up alarm time and (3) a processing subsystem coupled to the memory and communication subsystems and configured to: (3a) set a "sleep" temperature adjustment time based on a time the wake-up alarm time is received and (3b) set a "wake" temperature adjustment time based on the wake-up alarm time.

19 Claims, 1 Drawing Sheet

(56) References Cited

U.S. PATENT DOCUMENTS

Figure 1:
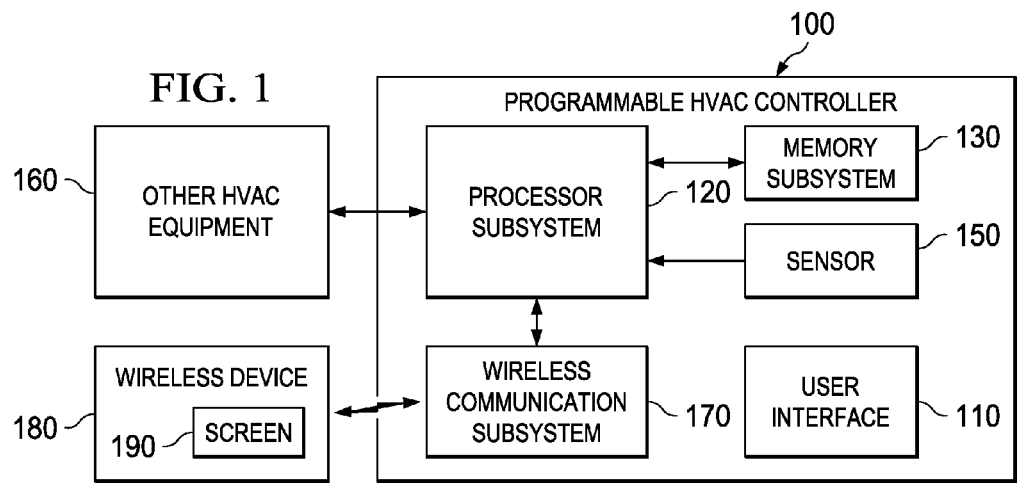

| | | | |
|---|---|---|---|
| 2010/0106305 A1* | 4/2010 | Pavlak et al. | 700/276 |
| 2011/0031806 A1* | 2/2011 | Altonen et al. | 307/32 |
| 2012/0001487 A1* | 1/2012 | Pessina | 307/31 |
| 2012/0095601 A1* | 4/2012 | Abraham et al. | 700/278 |
| 2012/0179547 A1* | 7/2012 | Besore et al. | 705/14.58 |
| 2012/0253527 A1* | 10/2012 | Hietala et al. | 700/278 |

* cited by examiner

SYSTEM AND METHOD FOR AUTOMATICALLY PROGRAMMING HVAC SYSTEM TEMPERATURE ADJUSTMENT TIMES

CROSS-REFERENCE TO RELATED APPLICATION

This application claims the benefit of U.S. Provisional Application Ser. No. 61/484,918, filed by DiFulgentiz on May 11, 2011, entitled "Scheduling Integration With Smartphone or Tablet Alarm," commonly assigned with this application and incorporated herein by reference.

TECHNICAL FIELD

This application is directed, in general, to heating, ventilation and air conditioning (HVAC) systems and, more specifically, to a system and method for automatically programming HVAC system temperature adjustment times.

BACKGROUND

A programmable HVAC controller (which may or may not include all of the features of a thermostat) is designed to adjust the temperature according to a series of programmed settings (sometimes called "setbacks") that take effect at different times of the day. In recent years, programmable HVAC controllers have become increasingly popular, as their use may result in energy savings of up to 30%. To achieve this performance, programmable HVAC controllers reduce the amount of heating/cooling provided by the heating, ventilating and air conditioning (HVAC) system responsible for conditioning the air within a space at propitious times. For example, during the cooling season, a programmable HVAC controller used in a home may be programmed to allow the temperature in the house to rise during the workday when no one is home but begin cooling the house before the occupants arrive, thereby allowing the house to be cooled down to the appropriate temperature setting upon the arrival of the occupants while saving energy during peak outdoor temperatures without sacrificing the occupants' comfort. Conversely, during the heating season, the programmable HVAC controller may be programmed to allow the temperature in the house to drop when the house is unoccupied during the day and also at night after all occupants have gone to bed and re-heating the house prior to the occupants arriving home in the evening or waking up in the morning.

A basic programmable HVAC controller implements a single program with two periods of time (a warmer period and a cooler period) that run every day. More sophisticated programmable HVAC controllers allow four (or more) warm and/or cool periods, commonly referred to as "wake," "leave," "return" and "sleep" times, to be set each day, each of which may be set to a unique temperature. Today, most programming of settings is done at a user interface of the controller and with reference to a clock internal to the controller or the HVAC system as a whole.

SUMMARY

One aspect provides a programmable HVAC controller. In one embodiment, the programmable HVAC controller includes: (1) a memory subsystem, (2) a communication subsystem configured to receive a wake-up alarm time and (3) a processing subsystem coupled to the memory and communication subsystems and configured to: (3a) set a "sleep" temperature adjustment time based on a time the wake-up alarm time is received and (3b) set a "wake" temperature adjustment time based on the wake-up alarm time.

Another aspect provides a method of automatically programming HVAC system temperature adjustment times. In one embodiment, the method includes: (1) receiving a wake-up alarm time into a programmable controller, (2) setting a "sleep" temperature adjustment time in a programmable HVAC controller based on a time the wake-up alarm time is received and (3) setting a "wake" temperature adjustment time in a programmable HVAC controller based on the wake-up alarm time.

Yet another aspect provides an HVAC system. In one embodiment, the HVAC system includes: (1) a programmable HVAC controller and (2) other HVAC equipment coupled to the programmable HVAC controller. The programmable HVAC controller includes: (1a) a memory subsystem, (1b) a wireless communication subsystem configured to receive a wake-up alarm time wirelessly and (1c) a processing subsystem coupled to the memory and wireless communication subsystems and configured to set a "sleep" temperature adjustment time based on a time the wake-up alarm time is received and further set a "wake" temperature adjustment time based on the wake-up alarm time.

BRIEF DESCRIPTION

Figure 2:
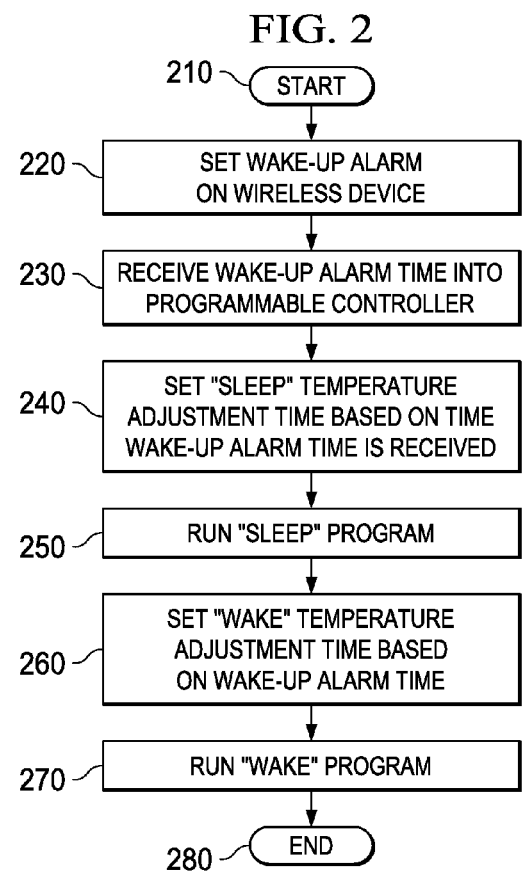

Reference is now made to the following descriptions taken in conjunction with the accompanying drawings, in which:

FIG. 1 is a block diagram of one embodiment of a programmable HVAC controller configured to accommodate a system for automatically programming HVAC system temperature adjustment times; and FIG. 2 is a flow diagram of one embodiment of a method of automatically programming HVAC system temperature adjustment times.

DETAILED DESCRIPTION

It is realized herein that the conventional approach to programming HVAC settings described in the Background above suffers from a significant disadvantage, namely that a person is required to make a separate and special effort to program settings using its dedicated, often wall-mounted, user interface.

Many people have come to rely on high-end cellphones, called "smartphones," and personal digital assistants (PDA), such as tablets, to satisfy a need for information and order in their lives. Examples of modern, commercially available smartphones include the Apple iPhone®, the Motorola Droid® and Triumph®, the BlackBerry Torch® and Bold®, the Sharp FX Plus®, the Samsung Vitality® and Admire®, the HTC Wildfire® and Status® and the LG Thrill® and Genesis®. Examples of modern, commercially available tablets include the Apple iPad®, the Sony Tablet S®, the Samsung Galaxy Tab 10.10, the Toshiba Thrive®, the Acer Iconia Tab A500®, the Asus Eee Pad Transformer® and the BlackBerry Playbook®.

Enabled by their powerful wireless communication capability, these relative newcomers have made significant strides toward replacing a host of previously ubiquitous appliances, such as desktop computers, telephones, stereos and televisions. Many have come to rely on smartphones and tablets, carrying them throughout the day and using them as their digital offices and secretaries. One other appliance that has fallen victim to smartphones and PDAs is the humble alarm clock. Upon the loading of a relatively simple application program ("app"), both smartphones and tablets are trivially capable of functioning as an alarm clock.

Viewed in light of the advantages that smartphones and PDAs offer and the sheer number of people who have come to rely on them, three astute observations are made. The first is that even conventional, programmable HVAC controllers that allow the programming of different sleep and wake times every day of the week still fail to accommodate the variations that occur in the average person's sleep schedule. The second is that, to force such a programmable HVAC controller to accommodate a typically varying sleep schedule requires a nightly visit to the user interface to make the needed changes. Handheld, wireless remote user interfaces do not make this job much easier. The third observation is that people tend to set wake-up alarms just before they go to sleep.

An opportunity therefore exists to make a programmable HVAC controller better able to accommodate a typical, varying sleep schedule. Accordingly, introduced herein are various embodiments of a system and method for automatically scheduling HVAC system temperature adjustment times. The various embodiments employ an alarm clock function, which may be carried out on a smartphone or a PDA, to program both the "sleep" and "wake" temperature adjustment times of a programmable HVAC controller automatically.

As those who have ever used an alarm clock know, setting a wake-up alarm involves a two-step process of selecting a wake-up time and activating the alarm function. The alarm function is then deactivated the following morning, usually after the alarm has rung. The various embodiments of the system and method therefore employ both of the steps in the two-step process to program the HVAC controller: the wake-up time is employed to program the "wake" temperature adjustment time automatically, and the time at which the alarm function is activated is employed to program the "sleep" temperature adjustment time automatically.

While a person explicitly enters a wake-up time, he does it for purposes of receiving a wake-up alarm, and not for purposes of programming a new "wake" temperature adjustment time; the system or method automatically programs the programmable HVAC controller for it. Further, while the same person explicitly activates the alarm function, he does not program a new "sleep" temperature adjustment time; the system or method automatically determines a new "sleep" temperature adjustment time and automatically programs the programmable HVAC controller for it.

Thus, the programming of "sleep" and "wake" temperature adjustment times no longer requires explicit action on the person's part. Further, the programming of "sleep" and "wake" temperature adjustment times can be performed implicitly by "non-native" devices, i.e., devices that are not purpose-built to be used in or with HVAC systems either in terms of their hardware or by means of apps designed to allow a person to control a programmable HVAC controller explicitly. An alarm clock app is not an app designed to allow a person to control a programmable HVAC controller explicitly.

It should also be understood that "wake," "leave," "return" and "sleep" are only examples of names for time periods. A particular programmable HVAC controller (e.g., thermostat) may accommodate a time period that can be programmed such that it begins around the time a person might wake up. That time is a "wake" temperature adjustment time, even though the programmable HVAC controller or its accompanying user manual may not refer to it as such. Likewise, the particular programmable HVAC controller may accommodate a time period that can be programmed such that it begins around the time a person might go to bed. That time is a "sleep" temperature adjustment time, even though the programmable HVAC controller or its accompanying user manual may not refer to it as such.

FIG. 1 is a block diagram of one embodiment of a programmable HVAC controller configured to accommodate a system for automatically scheduling HVAC system temperature adjustment times. In the embodiment illustrated in FIG. 1, the user interface 110, the processor subsystem 120 and the memory subsystem 130 are coupled together by a bus subsystem 140 for the exchange of address, data and control signals therebetween. As to the specific configuration of the bus subsystem 140, it should be noted that, while FIG. 1 suggests that discrete connections are employed to couple the user interface 110 and the memory subsystem 130, respectively, to the processor subsystem 120, e.g., a configuration similar to a system bus/local bus configuration, it is fully contemplated the user interface 110, the processor subsystem 120 and the memory subsystem 130 may all be coupled to a single bus, most commonly a system bus. Further, in the embodiment illustrated in FIG. 1, the temperature sensor 150 is illustrated as being directly coupled to the processor subsystem 120. However, it is fully contemplated that the temperature sensor 150 may instead be coupled to the bus subsystem 140. Finally, while disclosed as a component of the programmable HVAC controller 100, it is further contemplated that the temperature sensor 150 may instead be a discrete device located remote from the remainder of the programmable HVAC controller 100 and perhaps wirelessly coupled to the processor subsystem 120 or bus subsystem 140 of the programmable HVAC controller 100.

Other HVAC system equipment 160 is coupled to the programmable HVAC controller 100 in a manner which enables the programmable HVAC controller 100 to turn on, turn off or otherwise control the other HVAC system equipment 160 or portions thereof. For example, based upon data received from the temperature sensor 150 and information stored in the memory subsystem 130 and/or received from the user interface 110, the processor subsystem 120 may determine that outdoor, rooftop or indoor AC units forming part of the other HVAC system equipment 160 should be turned on in order to cool the interior of the building in which the thermostat 100 or the other HVAC system equipment 160 is installed. The processor subsystem 120 will then issue a control signal instructing the AC unit to turn on via bus 170. Variously, the bus 170 may be coupled directly to the processor subsystem 120 as shown in FIG. 1 or indirectly coupled to the processor subsystem 120 via the bus subsystem 140.

The programmable HVAC controller 100 of FIG. 1 further includes a wireless communication subsystem 170 coupled to the processor subsystem 120. The wireless communication subsystem 170 is configured to allow remote devices to provide data wirelessly to the processor subsystem 120. In one embodiment, the wireless communication subsystem 170 is further configured to allow the processor subsystem 120 to provide data wirelessly to remote devices. FIG. 1 shows one such wireless device 180. The wireless device 180 may be a smartphone, a tablet, a computer of another type or any other device capable of wirelessly communicating with the programmable HVAC controller 100 and supporting an alarm clock function, whether in software, firmware or hardware. The particular embodiment of the wireless device 180 illustrated in FIG. 1 has a screen 190 configured to provide information to a person and accept commands, including those for setting a wake-up alarm, from the person.

In an alternative embodiment, the wireless device 180 may be an alarm clock or television having wireless communication capability. Alternative embodiments employ a device connected to the programmable HVAC controller 100 by a wire, such as a desktop computer or a dedicated alarm clock.

Irrespective of the particular embodiment of device, the device is configured to execute alarm clock firmware or software, which may be an alarm clock app. The alarm clock firmware or software is configured to allow a person to select a wake-up time, activate and deactivate an alarm function and provide audible, visual or audiovisual stimulus at the selected wake-up time if the user activates the alarm function. The alarm clock firmware or software is further configured to transmit the wake-up time to the programmable HVAC controller 100 after the person has selected the wake-up time and activated the alarm function. In the illustrated embodiment, the alarm clock firmware or software is configured to transmit only the wake-up time. In an alternative embodiment, the alarm clock firmware or software is configured to transmit the time at which the person activated the alarm function, along with the wake-up time.

FIG. 2 is a flow diagram of one embodiment of a method of automatically scheduling HVAC system temperature adjustment times. The method begins in a start step 210. In a step 220, a wake-up alarm is set on a device, e.g., a wireless device, such as a smartphone or a tablet. In a step 230, the wake-up alarm time is received into a programmable controller. In a step 240, the "sleep" temperature adjustment time is set based on the time the wake-up alarm time is received. In one embodiment, the "sleep" temperature adjustment time is set to the time at which the time wake-up alarm time is received. In an alternative embodiment, the "sleep" temperature adjustment time is set to a time that is after the time at which the time wake-up alarm time is received (perhaps to give the person some time to read or otherwise finish preparing for sleep). In a step 250, the "sleep" program is run at the "sleep" temperature adjustment time, causing a "sleep" temperature to be selected as the setpoint temperature for the other HVAC system equipment 160 of FIG. 1. In a step 260, the "wake" temperature adjustment time is set based on the wake-up alarm time. In one embodiment, the "wake" temperature adjustment time is set to the wake-up alarm time. In an alternative embodiment, the "wake" temperature adjustment time is set to a time that is before the wake-up alarm time (perhaps to make things more comfortable when the person wakes up). In a step 270, the "wake" program is run at the "wake" temperature adjustment time, causing a "wake" temperature to be selected as the setpoint temperature for the other HVAC system equipment 160 of FIG. 1. The method ends in an end step 280.

For example, at 9pm, a person may set up a wake-up alarm for 6am. Accordingly, the wireless device transmits at approximately 9pm data indicating that the person has set a wake-up alarm for 6am. Upon receiving this data, the programmable HVAC controller sets the "sleep" temperature adjustment time to the approximately 9pm data receipt time and therefore runs the "sleep" program, causing the "sleep" temperature to be selected as the setpoint temperature. The programmable HVAC controller also sets the "wake" temperature adjustment time to 6am. At 6am, the programmable HVAC controller runs the "wake" program, causing the "wake" temperature to be selected as the setpoint temperature.

Those skilled in the art to which this application relates will appreciate that other and further additions, deletions, substitutions and modifications may be made to the described embodiments.

What is claimed is:

1. A programmable HVAC controller, comprising:
    a memory subsystem;
    a communication subsystem configured to receive a wake-up alarm time according to an alarm set by a user on a wireless device; and
    a processing subsystem coupled to said memory and communication subsystems and configured to:
        in response to receiving the wake-up alarm time, set a "sleep" temperature adjustment time based on a time subsequent to when said wake-up alarm time is received; and
        set a "wake" temperature adjustment time based on said wake-up alarm time.

2. The programmable HVAC controller as recited in claim 1 wherein said communication subsystem is a wireless communication subsystem configured to receive said wake-up alarm time wirelessly.

3. The programmable HVAC controller as recited in claim 1 wherein said wake-up alarm time is received from one of:
    a smartphone, and
    a tablet.

4. The programmable HVAC controller as recited in claim 1 wherein said processing subsystem is configured to set said "wake" temperature adjustment time to said wake-up alarm time.

5. The programmable HVAC controller as recited in claim 1 wherein said processing subsystem is configured to set said "wake" temperature adjustment time to a time before said wake-up alarm time.

6. A method of automatically programming HVAC system temperature adjustment times, comprising:
    receiving a wake-up alarm time into a programmable controller, according to an alarm time set by a user on a wireless device;
    in response to receiving the wake-up alarm time, setting a "sleep" temperature adjustment time in a programmable HVAC controller to a time subsequent to when said wake-up alarm time is received; and
    setting a "wake" temperature adjustment time in a programmable HVAC controller based on said wake-up alarm time.

7. The method as recited in claim 6 wherein said receiving comprises wirelessly receiving said wake-up alarm time.

8. The method as recited in claim 6 wherein said receiving comprises receiving said wake-up alarm time from one of:
    a smartphone, and
    a tablet.

9. The method as recited in claim 6 wherein said setting said "wake" temperature adjustment time comprises setting said "wake" temperature adjustment time to said wake-up alarm time.

10. The method as recited in claim 6 wherein said setting said "wake" temperature adjustment time comprises setting said "wake" temperature adjustment time to a time before said wake-up alarm time.

11. An HVAC system, comprising:
    a programmable HVAC controller; and
    other HVAC equipment coupled to said programmable HVAC controller, said programmable HVAC controller including:
        a memory subsystem,
        a wireless communication subsystem configured to receive a wake-up alarm time wirelessly, according to an alarm time set by a user on a wireless device, and
        a processing subsystem coupled to said memory and wireless communication subsystems and configured to:

in response to receiving the wake-up alarm time, set a "sleep" temperature adjustment time to a time subsequent to when said wake-up alarm time is received; and further set a "wake" temperature adjustment time based on said wake-up alarm time.

12. The HVAC system as recited in claim 11 wherein said wake-up alarm time is received from one of:
a smartphone, and
a tablet.

13. The HVAC system as recited in claim 11 wherein said processing subsystem is configured to set said "wake" temperature adjustment time to said wake-up alarm time.

14. The HVAC system as recited in claim 11 wherein said processing subsystem is configured to set said "wake" temperature adjustment time to a time before said wake-up alarm time.

15. A programmable HVAC controller, comprising:
a memory subsystem;
a communication subsystem configured to receive a wake-up alarm time according to an alarm set by a user on a wireless device; and
a processing subsystem coupled to said memory and communication subsystems and configured to set a "wake" temperature adjustment time to a time before said wake-up alarm time in response to receiving the wake-up alarm time.

16. The programmable HVAC controller as recited in claim 15 wherein said processing subsystem is further configured to a "sleep" temperature adjustment time based on a time said wake-up alarm time is received.

17. The programmable HVAC controller as recited in claim 16 wherein said processing subsystem is configured to set said "sleep" temperature adjustment time to said time at which said time wake-up alarm time is received.

18. The programmable HVAC controller as recited in claim 16 wherein said processing subsystem is configured to set said "sleep" temperature adjustment time to a time after said time at which said time wake-up alarm time is received.

19. A method of automatically programming HVAC system temperature adjustment times, comprising:
receiving a wake-up alarm time into a programmable controller, according to an alarm time set by a user on a wireless device; and
in response to receiving the wake-up alarm time, setting a "wake" temperature adjustment time in a programmable HVAC controller to a time before said wake-up alarm time.

* * * * *